United States Patent
Yao et al.

(10) Patent No.: US 11,802,673 B2
(45) Date of Patent: Oct. 31, 2023

(54) INTELLIGENT DIMMING RGB LED SPOTLIGHT WITH HIGH LIGHT QUALITY AND A METHOD FOR ACHIEVING THE SAME

(71) Applicant: Hengdian Group Tospo Lighting Co., Ltd., Jinhua (CN)

(72) Inventors: Zuohong Yao, Jinhua (CN); Linlin Cheng, Jinhua (CN); Liangtian Shangguan, Jinhua (CN); Xiangxiang Jin, Jinhua (CN)

(73) Assignee: HENGDIAN GROUP TOSPO LIGHTING CO., LTD., Jinhua (CN)

( * ) Notice: Subject to any disclaimer, the term of this patent is extended or adjusted under 35 U.S.C. 154(b) by 143 days.

(21) Appl. No.: 17/299,700

(22) PCT Filed: Jun. 22, 2020

(86) PCT No.: PCT/CN2020/097480
§ 371 (c)(1),
(2) Date: Jun. 3, 2021

(87) PCT Pub. No.: WO2021/189684
PCT Pub. Date: Sep. 30, 2021

(65) Prior Publication Data
US 2022/0307663 A1    Sep. 29, 2022

(30) Foreign Application Priority Data
Mar. 24, 2020   (CN) .......................... 202010211925.6

(51) Int. Cl.
*F21S 10/02*   (2006.01)
*F21V 29/83*   (2015.01)
(Continued)

(52) U.S. Cl.
CPC ............. *F21S 10/02* (2013.01); *F21V 3/02* (2013.01); *F21V 5/04* (2013.01); *F21V 23/005* (2013.01); *F21V 29/83* (2015.01); *F21Y 2115/10* (2016.08)

(58) Field of Classification Search
CPC ............ F21K 9/23–238; F21K 9/60–69; F21S 10/02–023; F21V 3/02–08;
(Continued)

(56) References Cited

U.S. PATENT DOCUMENTS

| | | | |
|---|---|---|---|
| 2013/0293148 A1* | 11/2013 | Holland | ................... F21V 29/83 315/297 |
| 2014/0168992 A1* | 6/2014 | Xue | ......................... F21V 13/02 313/111 |

FOREIGN PATENT DOCUMENTS

| | | |
|---|---|---|
| CN | 201925768 U | 8/2011 |
| CN | 202521438 U | 11/2012 |

(Continued)

OTHER PUBLICATIONS

International Search Report and Written Opinion for corresponding International Application No. PCT/CN2020/097480 dated Nov. 30, 2020.

*Primary Examiner* — Jason M Han
(74) *Attorney, Agent, or Firm* — Steven M. Koehler; Westman, Champlin & Koehler, P.A.

(57) ABSTRACT

An intelligent dimming RGB LED spotlight comprises an outer shell, a lamp base and a lampshade. A drive board connects to the lamp base and a light source board. The light source board is provided with dense ordinary-color-temperature lamp beads and RGB color-changing lamp beads, and is connected above to the lampshade corresponding to the RGB color-changing lamp beads. A method for achieving the intelligent dimming RGB LED spotlight includes the lampshade scattering the light emitted by the RGB color- (Continued)

changing lamp beads, so as to reduce the light intensity and make the light-emitting area larger and the emitted light more uniform, while it does not block the light emitted by the ordinary-color-temperature lamp beads, which makes the generated light spot have balanced illumination and a uniform and high-purity color in the color-changing process of a variety of colors, able to achieve the effect of AA level of GB illumination.

13 Claims, 5 Drawing Sheets

(51) Int. Cl.
*F21V 3/02* (2006.01)
*F21V 5/04* (2006.01)
*F21V 23/00* (2015.01)
*F21Y 115/10* (2016.01)

(58) Field of Classification Search
CPC ..... F21V 5/04–048; F21V 19/001–007; F21V 29/83; F21Y 2103/33; F21Y 2105/12; F21Y 2115/10
See application file for complete search history.

(56) References Cited

FOREIGN PATENT DOCUMENTS

| | | |
|---|---|---|
| CN | 203273343 U | 11/2013 |
| CN | 111256083 A | 6/2020 |
| CN | 211450747 U | 9/2020 |
| KR | 20160136663 A | 11/2016 |

* cited by examiner

INTELLIGENT DIMMING RGB LED SPOTLIGHT WITH HIGH LIGHT QUALITY AND A METHOD FOR ACHIEVING THE SAME

CROSS-REFERENCE TO RELATED APPLICATION(S)

This application is a Section 371 National Stage Application of International Application No. PCT/CN2020/097480, filed Jun. 22, 2020.

FIELD OF THE INVENTION

The present invention belongs to the technical field of spotlights, and specifically relates to an intelligent dimming RGB LED spotlight with high light quality and a method for achieving the same.

BACKGROUND OF THE INVENTION

At present, lighting control is required by the global market to be more and more intelligent, and colorful urban night scenes are increasingly appearing in all corners of the world. Spotlights are inevitably used in the field of intelligent control. The technology used to realize the intelligent control of RGB in the spotlight structure is the same as that used in the ordinary bulb structure. However, because the lens of the spotlight is made of transparent material, and multiple RGB lamp beads are scattered and it is difficult to receive light, the emitted light presents a dot-like distribution and is relatively dazzling. Nowadays, people demand higher and higher light quality. In order to improve the light quality of the RGB lamp beads of the spotlight, it is necessary to develop an RGB intelligent control spotlight with more beautiful light effect to meet the ever-changing market demand.

The prior art has the following shortcomings:

1. The lamp bead light sources of different colors are matched with separate independent lenses to emit light, which makes the light color spots dispersed and impairs the overall light experience;

2. the color of the light spots is messy and impure, and the light spots of different colors are staggered when color is changed;

3. the light emitted by the RGB lamp beads do not receive secondary optical processing, which makes the generated light spots scattered and dazzling; and 4. high-cost stacked lamp beads are used to achieve a uniform luminous effect.

CONTENTS OF THE INVENTION

An object of the present invention is to provide an intelligent dimming RGB LED spotlight with high light quality to solve the problems raised in the "Background of the Invention". The intelligent dimming RGB LED spotlight with high light quality provided by the present invention has the characteristics of high color purity and uniform illumination.

Another object of the present invention is to provide a method for achieving the intelligent dimming RGB LED spotlight with high light quality.

In order to achieve the above objects, the present invention provides the following technical solution: An intelligent dimming RGB LED spotlight with high light quality is provided, comprising the following components: an outer shell, provided inside with a drive board, is connected with a lamp base at the lower end and with a lampshade at the upper part; the drive board, provided above with a light source board, is electrically connected to the lamp base and the light source board, respectively; the light source board is respectively provided with dense ordinary-color-temperature lamp beads distributed in the middle of the light source board and a plurality of RGB color-changing lamp beads distributed in a circular array on the circumference of the light source board, and is connected above to the lampshade corresponding to the RGB color-changing lamp beads.

Further, in the present invention, a heat radiating holder is embedded in the outer shell and located above the drive board, and is connected inside to the light source board.

Further, in the present invention, the lampshade is of an annular structure.

Further, in the present invention, the lampshade is a milky-white PC component.

Further, in the present invention, the lens is of a single-cup structure.

Further, in the present invention, the lens is provided in the middle with a light-receiving region and on the periphery with a non-light-receiving region.

Further, in the present invention, the diameter of the concentric circle where the plurality of RGB color-changing lamp beads are located is larger than the diameter of the light-receiving region.

Further, in the present invention, the ordinary-color-temperature lamp beads are arranged side by side in two lines, one for the low-color-temperature lamp beads and the other for the high-color-temperature lamp beads.

Further, in the present invention, the intelligent dimming RGB LED spotlight with high light quality is achieved by a method comprising the following steps:

(1) the dense ordinary-color-temperature lamp beads are distributed in the middle of the light source board to realize the main function;

(2) the plurality of RGB color-changing lamp beads are distributed in a circular array on the circumference of the light source board to realize the scene lighting function;

(3) the lampshade can reduce the intensity of the light emitted by the RGB color-changing lamp beads, so as to make the light-emitting area larger and the emitted light more uniform, while it does not block the light emitted by the ordinary-color-temperature lamp beads;

(4) the light processed by the lampshade can pass through the non-light-receiving region of the lens 7, so that the generated light spot have balanced illumination and a uniform and high-purity color in the color-changing process of a variety of colors; and (5) the ordinary-color-temperature lamp beads are arranged side by side in two lines, one for the low-color-temperature lamp beads and the other for the high-color-temperature lamp beads, so as to achieve more than two color-temperature regulating and lighting effects.

Further, in the present invention, according to the method for achieving the intelligent dimming RGB LED spotlight with high light quality, a heat radiating holder is embedded in the outer shell and located above the drive board, and is connected inside to the light source board; the lampshade is a milky-white PC component, and has an annular structure; the lens, having a single-cup structure, is provided in the middle with a light-receiving region and on the periphery with a non-light-receiving region; the diameter of the concentric circle where the plurality of RGB color-changing lamp beads are located is larger than the diameter of the light-receiving region; the ordinary-color-temperature lamp beads are arranged side by side in two lines, one for low-color-temperature lamp beads and the other for high-color-temperature lamp beads.

The present invention has the following beneficial effects compared with the prior art:

1. In the present invention, the lampshade scatters the light emitted by the RGB color-changing lamp beads, so as to reduce the light intensity and make the light-emitting area larger and the emitted light more uniform, while it does not block the light emitted by the ordinary-color-temperature lamp beads, which makes the generated light spot have balanced illumination and a uniform and high-purity color in the color-changing process of a variety of colors, able to achieve the effect of AA level of GB illumination;

2. the lens of the present invention includes a light-receiving region and a non-light-receiving region, so there is no need to match the lamp bead light sources of different colors with independent lenses, thereby achieving simpler structure, low production cost, and high installation efficiency;

3. in the present invention, the ordinary-color-temperature lamp beads are arranged side by side in a staggered manner in two lines, one for the low-color-temperature lamp beads and the other for the high-color-temperature lamp beads, which can achieve not only individual color temperature dimming but also more than two color-temperature regulating and lighting effects;

4. in the present invention, with the lens having a single-cup structure, the cup-shaped outer wall of the lens can be flexibly designed, for example, to have a shape of smooth full-circle arc or evenly distributed scales, so that it looks beautiful and elegant, and the light beams emitted after light receiving are concentrated and can form a uniform light spot; and 5. in the present invention, a uniform color temperature can be obtained from two color temperatures after light mixing; and the non-light-receiving part is designed to have evenly distributed small bead surfaces, which can both effectively shield the internal structure and play a decorative role, and can better make the light emitted by the RGB color-changing lamp bead softened in this structure.

In the figures: 1. lamp base; 2. outer shell; 3. drive board; 4. heat radiating holder; 5. light source board; 51. RGB color-changing lamp bead; 52. ordinary-color-temperature lamp bead; 6. lampshade; 7. lens; 71. light-receiving region; and 72. non-light-receiving region.

DETAILED DESCRIPTION OF THE EMBODIMENTS

The technical solution in the examples of the present invention will be described clearly and completely with reference to the diagrams in the examples of the present invention. Obviously, the described examples are only some, rather than all, of the examples of the present invention. Any other example obtained by those of ordinary skill in the art according to the examples of the present invention without making any inventive effort shall fall within the scope of protection of the present invention.

Example 1

Figure 1:
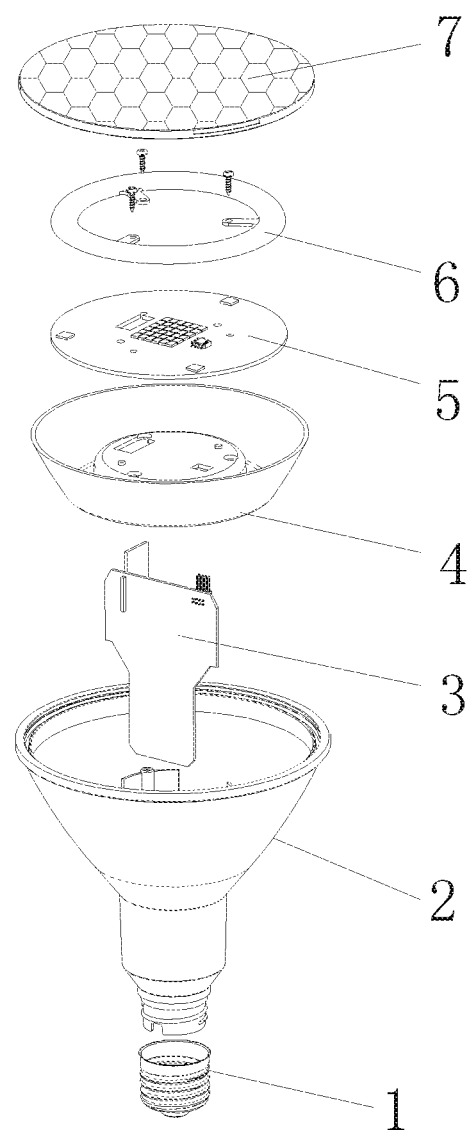
FIG. 1 is an exploded schematic diagram of the structure of the present invention.
Figure 2:
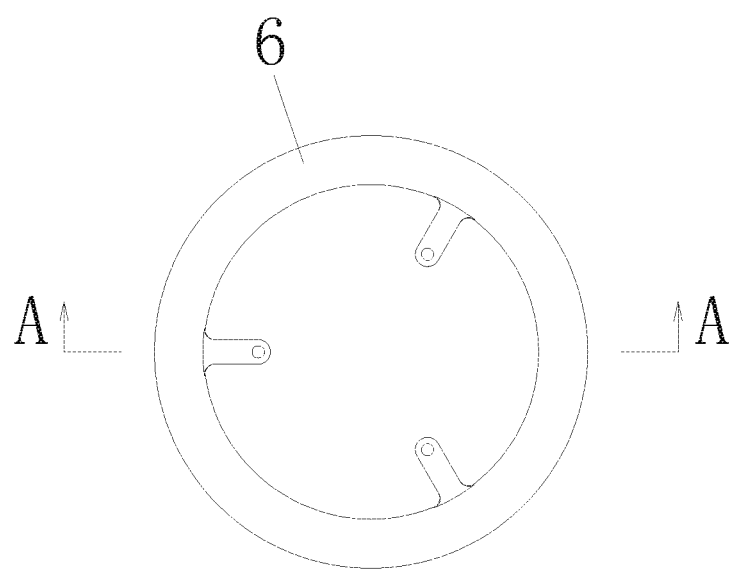
FIG. 2 is a schematic diagram of the structure of the lampshade of the present invention.
Figure 3:
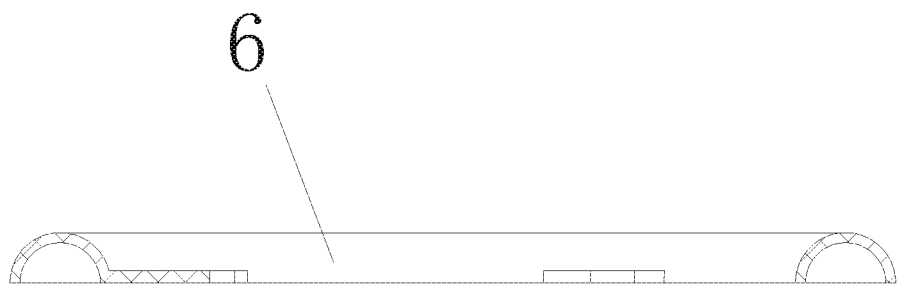
FIG. 3 is a schematic sectional view of the structure along the A-A direction in FIG. 2 of the present invention.
Figure 4:
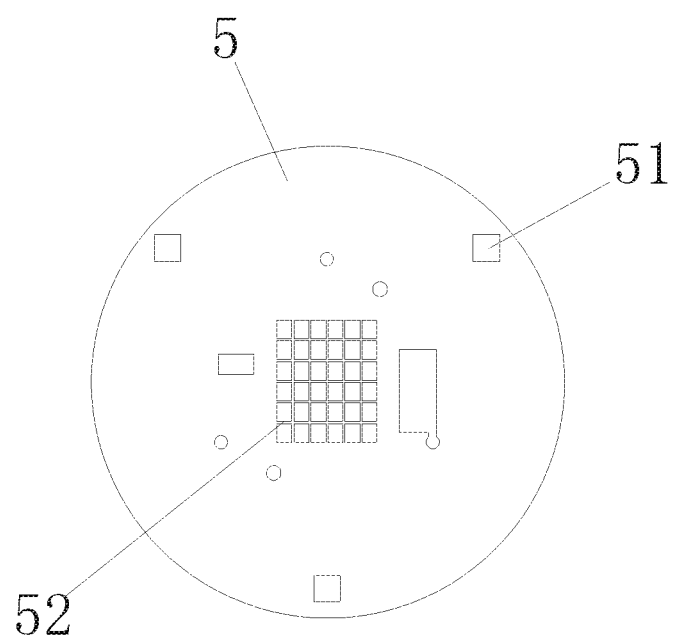
FIG. 4 is a schematic diagram of the structure of the light source board of the present invention.
Figure 5:
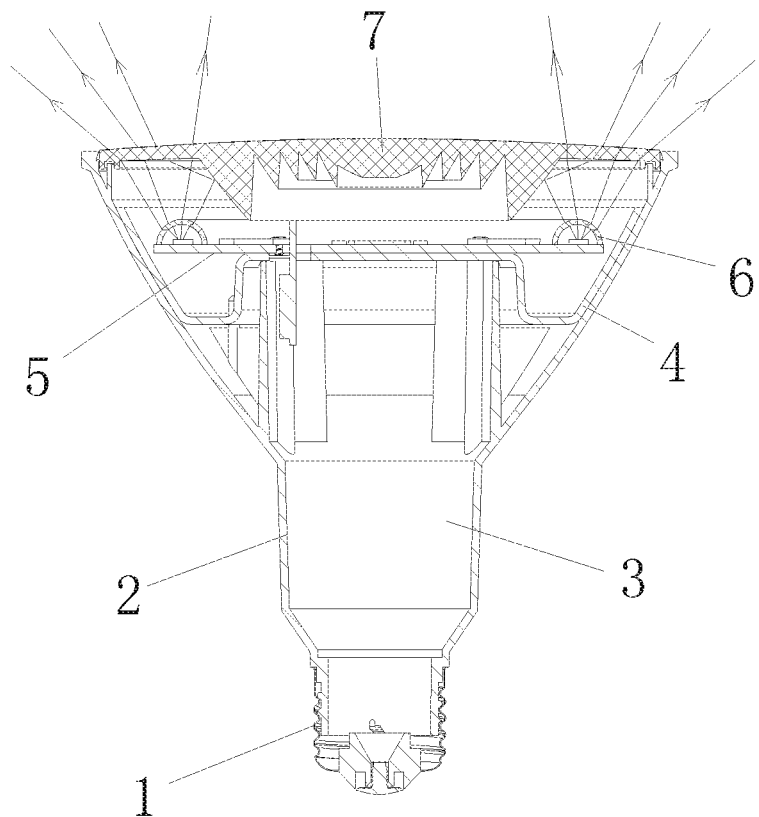
FIG. 5 is a schematic sectional view of the structure of the present invention.
Figure 6:
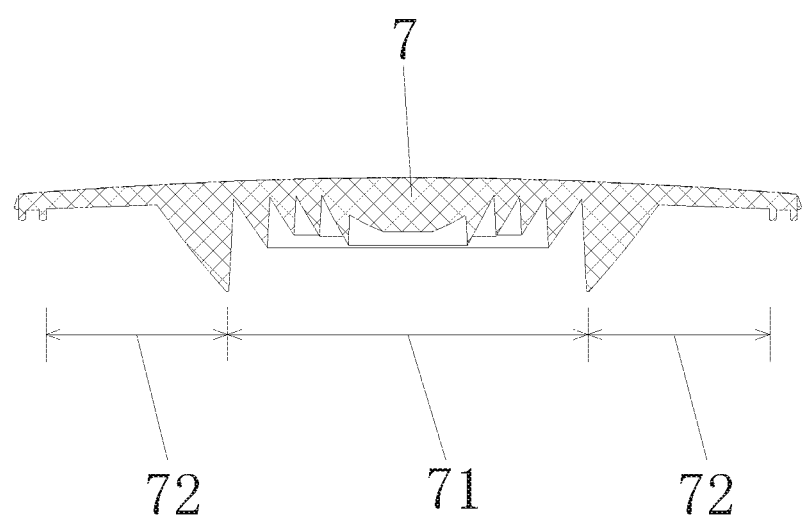
FIG. 6 is a schematic sectional view of the structure of the lens of the present invention.

As shown in FIGS. 1-6, the present invention provides the following technical solution: An intelligent dimming RGB LED spotlight with high light quality is provided, comprising the following components: an outer shell 2, provided inside with a drive board 3, is connected with a lamp base 1 at the lower end and with a lampshade 6 at the upper part; the drive board 3, provided above with a light source board 5, is electrically connected to the lamp base 1 and the light source board 5, respectively; the light source board 5 is respectively provided with dense ordinary-color-temperature lamp beads 52 distributed in the middle of the light source board 5 and three RGB color-changing lamp beads 51 distributed in a circular array on the circumference of the light source board 5, and is connected above to the lampshade 6 corresponding to the RGB color-changing lamp beads 51.

Specifically, a heat radiating holder 4 is embedded in the outer shell 2 and located above the drive board 3, and is connected inside to the light source board 5.

In the above technical solution, heat is dissipated through the heat radiating holder 4, so that the heat dissipation effect of this structure is improved.

Specifically, the lampshade 6 is a milky-white PC component, and has an annular structure.

In the above technical solution, the lampshade 6 is made of a PC translucent material added with a diffusing agent, and uses scattering particles to reduce the intensity of the light emitted by the RGB color-changing lamp beads 51, so as to make the light-emitting area larger and the emitted light more uniform.

Example 2

The difference between Example 2 and Example 1 is as follows: Specifically, the lens 7 is of a single-cup structure.

In the above technical solution, the cup-shaped outer wall of the lens 7 can be flexibly designed, for example, to have a shape of smooth full-circle arc or evenly distributed scales, so that it looks beautiful and elegant, and the light beams emitted after light receiving are concentrated and can form a uniform light spot; a uniform color temperature can be obtained from two color temperatures after light mixing; the non-light-receiving part is designed to have evenly distributed small bead surfaces, which can both effectively shield the internal structure and play a decorative role, and can better make the light emitted by the RGB color-changing lamp bead softened in this structure.

Specifically, the lens 7 is provided in the middle with a light-receiving region 71 and on the periphery with a non-light-receiving region 72, with the diameter of the concentric circle where the three RGB color-changing lamp beads 51 are located larger than the diameter of the light-receiving region 71.

By adopting the above technical solution, the light emitted by the RGB color-changing lamp beads 51 is scattered by the lampshade 6 before passing through the non-light-receiving region 72 of the lens 7, which makes the generated light spot have balanced illumination and a uniform and high-purity color in the color-changing process of a variety of colors, able to achieve the effect of AA level of GB illumination.

Example 3

The difference between Example 3 and Example 1 is as follows: Specifically, the ordinary-color-temperature lamp beads 52 are arranged side by side in two lines, one for the low-color-temperature lamp beads and the other for the high-color-temperature lamp beads.

In the above technical solution, there are 18 high-color-temperature lamp beads in one line, and 18 low-color-temperature lamp beads in the other line, with the two kinds of color-temperature lamp beads arranged in a staggered manner; these two lines of lamp beads can achieve more than two color-temperature regulating and lighting effects, realize the narrow beam angle function of the spotlight, and present at least three color temperatures, with each kind of the color-temperature lamp beads able to meet the requirements of lighting from the same angle.

In the present invention, the drive board 3 is a 14 W non-isolated drive of the model G1 TP120-14/PAR38 RGBCW T20 purchased from TOSPO (Debang) Lighting Co., Ltd., Hengdian Group, Dongyang City, Zhejiang Province, the ordinary-color-temperature lamp bead 52 is of the type 2835 produced by the manufacturer SMALITE, and the RGB color-changing lamp bead 51 is of the type 5050 produced by the manufacturer LIGHTNING (Tiandian).

Further, the intelligent dimming RGB LED spotlight with high light quality according to the present invention is achieved by a method comprising the following steps:

(1) Dense ordinary-color-temperature lamp beads 52 are distributed in the middle of the light source board 5 to realize the main function, such as the narrow beam angle function of the spotlight;

(2) three RGB color-changing lamp beads 51 are distributed in a circular array on the circumference of the light source board 5 to realize the scene lighting function, such as the wall washing lamp function;

(3) the lampshade 6 can reduce the intensity of the light emitted by the RGB color-changing lamp beads 51, so as to make the light-emitting area larger and the emitted light more uniform, while it does not block the light emitted by the ordinary-color-temperature lamp beads 52;

(4) the light processed by the lampshade 6 can pass through the non-light-receiving region 72 of the lens 7, so that the generated light spot have balanced illumination and a uniform and high-purity color in the color-changing process of a variety of colors; and (5) the ordinary-color-temperature lamp beads 52 are arranged side by side in two lines, one for the low-color-temperature lamp beads and the other for the high-color-temperature lamp beads, so as to achieve more than two color-temperature regulating and lighting effects.

In summary, in the present invention, the lampshade scatters the light emitted by the RGB color-changing lamp beads, so as to reduce the light intensity and make the light-emitting area larger and the emitted light more uniform, while it does not block the light emitted by the ordinary-color-temperature lamp beads, which makes the generated light spot have balanced illumination and a uniform and high-purity color in the color-changing process of a variety of colors, able to achieve the effect of AA level of GB illumination; the lens of the present invention includes a light-receiving region and a non-light-receiving region, so there is no need to match the lamp bead light sources of different colors with independent lenses, thereby achieving simpler structure, low production cost, and high installation efficiency; in the present invention, the ordinary-color-temperature lamp beads are arranged side by side in a staggered manner in two lines, one for the low-color-temperature lamp beads and the other for the high-color-temperature lamp beads, which can achieve not only individual color temperature dimming but also more than two color-temperature regulating and lighting effects; in the present invention, with the lens having a single-cup structure, the cup-shaped outer wall of the lens can be flexibly designed, for example, to have a shape of smooth full-circle arc or evenly distributed scales, so that it looks beautiful and elegant, and the light beams emitted after light receiving are concentrated and can form a uniform light spot; in the present invention, a uniform color temperature can be obtained from two color temperatures after light mixing, and the non-light-receiving part is designed to have evenly distributed small bead surfaces, which can both effectively shield the internal structure and play a decorative role, and can better make the light emitted by the RGB color-changing lamp bead softened in this structure.

Although the examples of the present invention have been shown and described, it is understood by those of ordinary skill in the art that various changes, modifications, substitutions and variations can be made to these examples without departing from the principle and spirit of the present invention, and the scope of the present invention is defined by the appended claims and their equivalent.

The invention claimed is:

1. An intelligent dimming red-green-blue (RGB)RGB LED spotlight comprising an outer shell, wherein the outer shell, provided inside with a drive board, is connected with a lamp base at the lower end and with a lampshade at an upper part; the drive board, provided above with a light source board, is electrically connected to the lamp base and the light source board, respectively; the light source board is respectively provided with dense ordinary-color-temperature lamp beads distributed in the middle of the light source board and a plurality of RGB color-changing lamp beads distributed in a circular array on a circumference of the light source board, and is connected above to the lampshade corresponding to the RGB color-changing lamp beads:

wherein the lampshade is configured to reduce an intensity of light emitted by the RGB color-changing lamp beads and not to block light emitted by the ordinary-color-temperature lamp beads; and wherein a lens is located above the lampshade, the lens includes a light-receiving region provided in a middle of the lens and a non-light-receiving region provided at a periphery of the lens, the non-light-receiving region is configured for the light processed by the lampshade to pass through.

2. The intelligent dimming RGB LED spotlight according to claim 1, wherein a heat radiating holder is embedded in the outer shell and located above the drive board, and is connected inside to the light source board.

3. The intelligent dimming RGB LED spotlight according to claim 2, wherein the lampshade is of an annular structure.

4. The intelligent dimming RGB LED spotlight according to claim 3, wherein the lampshade is a milky-white polycarbonate (PC) component.

5. The intelligent dimming RGB LED spotlight according to claim 4, wherein the lens is of a single-cup structure.

6. The intelligent dimming RGB LED spotlight according to claim 5, wherein a diameter of a concentric circle where the plurality of RGB color-changing lamp beads is located is larger than a diameter of the light-receiving region.

7. The intelligent dimming RGB LED spotlight according to claim 6, wherein the ordinary-color-temperature lamp beads comprises low-color-temperature lamp beads and high-color-temperature lamp beads, the low-color-temperature lamp beads and the high-color-temperature lamp beads are arranged in a staggered manner.

8. A method for achieving an intelligent dimming red-green-blue (RGB)LED spotlight, the method comprising:
   distributing dense ordinary-color-temperature lamp beads in a middle of a light source board, wherein the ordinary-color-temperature lamp beads comprises low-color temperature lamp beads and high-color-temperature lamp beads, the low-color-temperature lamp beads and the high-color-temperature lamp beads being arranged in a staggered manner;
   distributing a plurality of RGB color-changing lamp beads in a circular array on a circumference of the light source board;
   reducing an intensity of light emitted by the RGB color-changing lamp beads via a lampshade which does not block light emitted by the ordinary-color-temperature lamp beads; and
   providing a lens above the lampshade, and allowing light processed by the lampshade to pass through a non-light-receiving region of the lens.

9. The method for achieving the intelligent dimming RGB LED spotlight according to claim 8, wherein a heat radiating holder is embedded in an outer shell and located above a drive board, and is connected inside to the light source board, the drive board being electrically connected to a lamp base and the light source board.

10. The method for achieving the intelligent dimming RGB LED spotlight according to claim 8, wherein the lampshade is a milky-white PC component.

11. The method for achieving the intelligent dimming RGB LED spotlight according to claim 8, wherein the lampshade is of an annular structure.

12. The method for achieving the intelligent dimming RGB LED spotlight according to claim 8, wherein the lens is of a single-cup structure.

13. The method for achieving the intelligent dimming RGB LED spotlight according to claim 8, wherein a diameter of a concentric circle where the plurality of RGB color-changing lamp beads is located is larger than a diameter of the light-receiving region.

* * * * *